United States Patent
Zhang et al.

(10) Patent No.: US 11,463,938 B2
(45) Date of Patent: Oct. 4, 2022

(54) MANAGING CONTROL PLANE LATENCY FOR INTEGRATED ACCESS AND BACKHAUL

(71) Applicant: Apple Inc., Cupertino, CA (US)

(72) Inventors: Yujian Zhang, Beijing (CN); Qian Li, Beaverton, OR (US); Youn Hyoung Heo, Seoul (KR); Sudeep K. Palat, Cheltenham (GB); Murali Narasimha, Lake Oswego, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/275,108

(22) PCT Filed: Sep. 25, 2019

(86) PCT No.: PCT/US2019/052900
§ 371 (c)(1),
(2) Date: Mar. 10, 2021

(87) PCT Pub. No.: WO2020/068940
PCT Pub. Date: Apr. 2, 2020

(65) Prior Publication Data
US 2022/0053408 A1    Feb. 17, 2022

Related U.S. Application Data

(60) Provisional application No. 62/736,761, filed on Sep. 26, 2018.

(51) Int. Cl.
*H04W 40/22* (2009.01)
*H04B 7/15* (2006.01)
(Continued)

(52) U.S. Cl.
CPC .............. *H04W 40/22* (2013.01); *H04B 7/15* (2013.01); *H04W 28/0268* (2013.01);
(Continued)

(58) Field of Classification Search
CPC . H04W 40/22; H04W 28/0268; H04W 40/30; H04W 72/1278; H04W 74/0833;
(Continued)

(56) References Cited

U.S. PATENT DOCUMENTS

| 2011/0269393 A1 | 11/2011 | Ostergaard et al. |
| 2017/0005913 A1 | 1/2017 | Hampel et al. |

(Continued)

FOREIGN PATENT DOCUMENTS

| EP | 3570617 A1 | 11/2019 |
| GB | 201810235 | 12/2019 |

(Continued)

OTHER PUBLICATIONS

Kyocera, "Consideration of Low Latency Scheduling for Multi-Hop Backhauling", 3GPP TSG-RAN WG2, #106; R2-1906653; Reno, USA; May 2019; 4 pgs.

(Continued)

*Primary Examiner* — Ashley Shivers
(74) *Attorney, Agent, or Firm* — Kowert, Hood, Munyon, Rankin & Goetzel, P.C.

(57) ABSTRACT

Systems and methods of reducing control plane latency in a 5G IAB network are described. SRs transmitted between nodes indicate that a control plane PDU is to be transmitted. The SRs use periodic resources or OCCs reserved for control plane signaling and are initiated by an RRC message or RACH from the UE. The SRs are initiated if the LCID field in the MAC subheader of the RRC message indicates the CCCH or the DCCH logical channel. If the PDU is available after the original resource, a resource is used that is provided via another grant, which is periodically provided or automatically initiated due to failure to transmit on the original grant. The SR or RRC message can also specify a delayed timeslot for the grant. For contention-based proce- (Continued)

dures the RACH preamble is randomly selected or selected from among a set of RACH preambles assigned for RRC procedures.

20 Claims, 9 Drawing Sheets

(51) Int. Cl.
  *H04W 72/12* (2009.01)
  *H04W 28/02* (2009.01)
  *H04W 40/30* (2009.01)
  *H04W 74/08* (2009.01)
  *H04W 84/04* (2009.01)
  *H04W 88/08* (2009.01)
  *H04W 92/20* (2009.01)

(52) U.S. Cl.
  CPC ....... *H04W 40/30* (2013.01); *H04W 72/1278* (2013.01); *H04W 74/0833* (2013.01); *H04W 28/0278* (2013.01); *H04W 84/047* (2013.01); *H04W 88/08* (2013.01); *H04W 92/20* (2013.01)

(58) Field of Classification Search
  CPC ........... H04W 28/0278; H04W 84/047; H04W 88/08; H04W 92/20; H04B 7/15
  See application file for complete search history.

(56) References Cited

U.S. PATENT DOCUMENTS

2018/0092139 A1   3/2018 Novlan et al.
2019/0357247 A1*  11/2019 Keskitalo .......... H04W 72/1284

FOREIGN PATENT DOCUMENTS

WO   2018067409 A1   4/2018
WO   2020/027602 A1  2/2020

OTHER PUBLICATIONS

Extended European Search Report; European Application No. 19865694.4, dated Nov. 30, 2021; 11 pgs.
Intellectual Property India; First Examination Report; Application No. 202117008291; dated Jan. 24, 2022; 6 pgs.
ZTE, "Discussion on Flow Control in IAB", 3GPP TSG-RAN WG2, R2-1812463, Meeting #103, Aug. 2018, Gothenburg, Sweden, 5 pgs.
ZTE, "Consideration on RLC ARQ in IAB", 3GPP TSG-RAN WG2, R2-1807396, Meeting #102, May 2018, Busan, Korea, 6 pgs.
International Search Report and Written Opinion for International Application No. PCT/US2019/052900, dated Jan. 9, 2020, 8 pgs.

* cited by examiner

MANAGING CONTROL PLANE LATENCY FOR INTEGRATED ACCESS AND BACKHAUL

This application is a U.S. National Stage filing of International Application No. PCT/US2019/052900, filed Sep. 25, 2019, which claims the benefit of priority to U.S. Provisional Application No. 62/736,761, filed Sep. 26, 2018, each of which is incorporated herein by reference in its entirety.

TECHNICAL FIELD

Embodiments pertain to radio access networks (RANs). Some embodiments relate to cellular networks, including Third Generation Partnership Project (3GPP) Long Term Evolution (LTE), $4^{th}$ generation (4G) and $5^{th}$ generation (5G) New Radio (NR) (or next generation (NG)) networks. Some embodiments relate to Integrated Access Backhaul (IAB) nodes in 5G systems.

BACKGROUND

The use of various types of systems has increased due to both an increase in the number and types of user equipment (UEs) using network resources as well as the amount of data and bandwidth being used by various applications, such as video streaming, operating on these UEs. Bandwidth, latency, and data rate enhancement may be used to deliver the continuously-increasing demand for network resources. The next generation wireless communication system, 5G or NR, will provide ubiquitous connectivity and access to information, as well as ability to share data, by various users and applications. NR is expected to be a unified framework that targets to meet starkly different and sometimes, conflicting performance criteria and services. In general, NR will evolve based on 3GPP LTE-Advanced technology with additional enhanced radio access technologies (RATs) to enable seamless wireless connectivity solutions. The use of complex IAB networks and IAB nodes may, however, encounter lower performance levels than non-IAB network. These decreased performance levels may be due to, for example, hopping patterns used in IAB networks.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
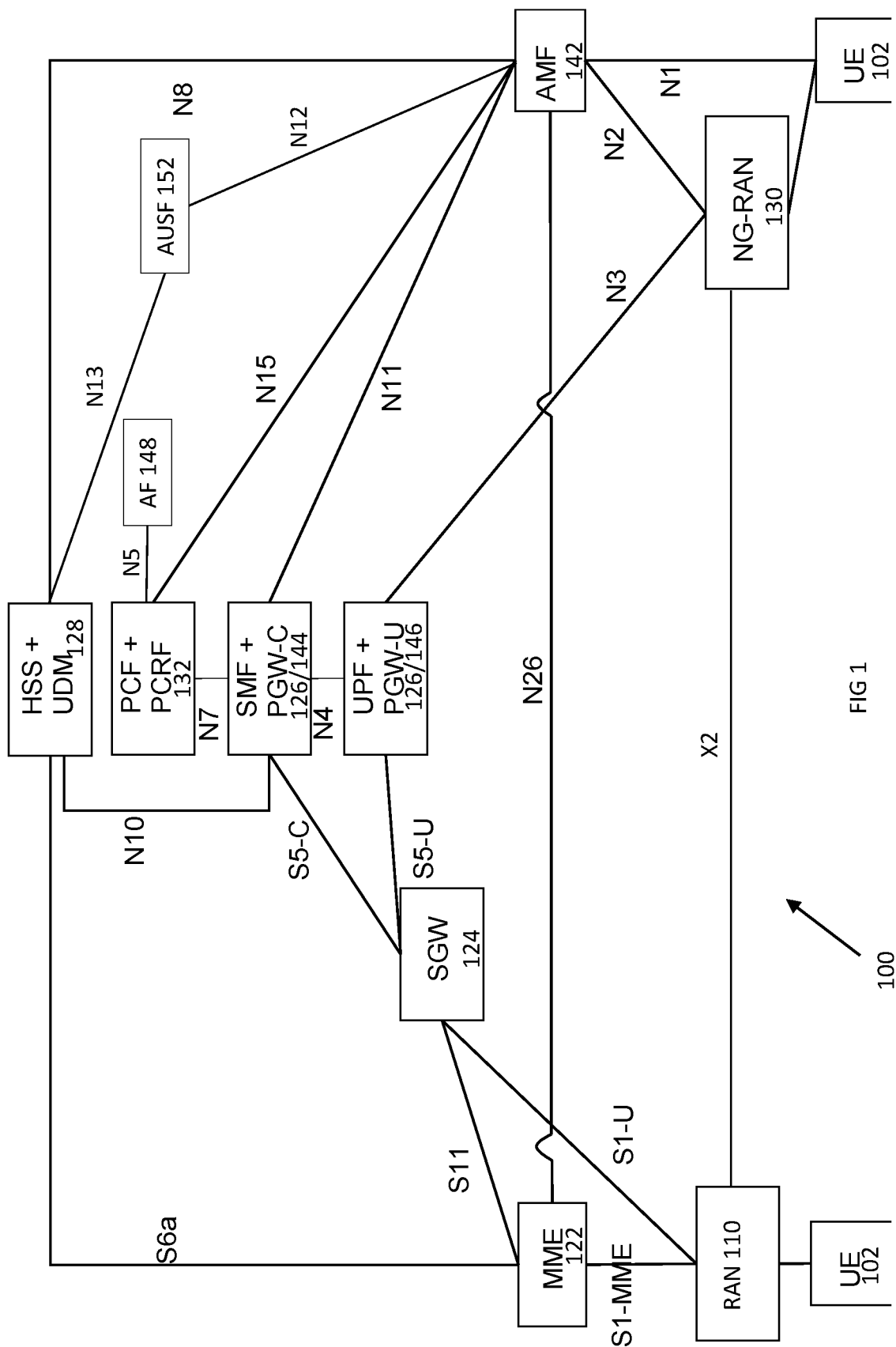
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to either an access network or random access network (RAN) 110 and/or may be connected to the NG-RAN 130 (gNB) or an Access and Mobility Function (AMF) 142. The RAN 110 may be an eNB or a general non-3GPP access point, such as that for Wi-Fi. The NG core network may contain multiple network functions besides the AMF 112. The UE 102 may generate, encode and perhaps encrypt uplink transmissions to, and decode (and decrypt) downlink transmissions from, the RAN 110 and/or gNB 130 (with the reverse being true by the RAN 110/gNB 130).

The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
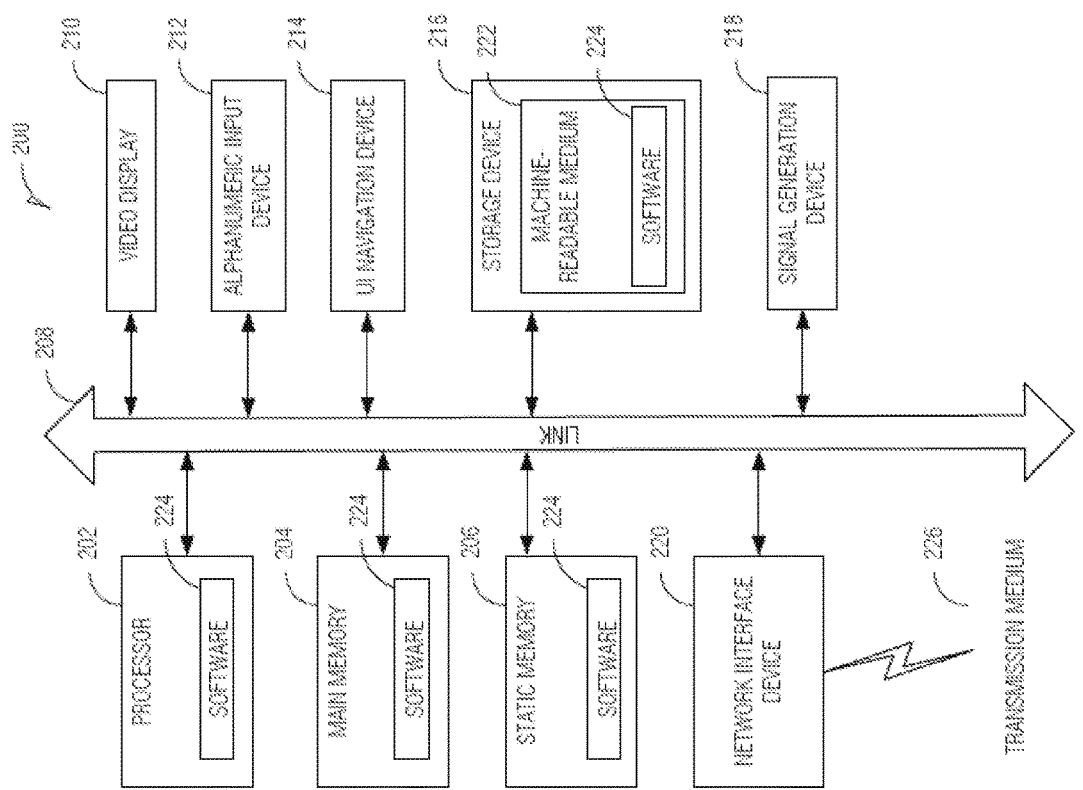
FIG. 2 illustrates a block diagram of a communication device in accordance with some embodiments.

FIG. 2 illustrates a block diagram of a communication device in accordance with some embodiments. In some embodiments, the communication device may be a UE (including an IoT device and NB-IoT device), eNB, gNB or other equipment used in the network environment. For example, the communication device 200 may be a specialized computer, a personal or laptop computer (PC), a tablet PC, a mobile telephone, a smart phone, a network router, switch or bridge, or any machine capable of executing instructions (sequential or otherwise) that specify actions to be taken by that machine. In some embodiments, the communication device 200 may be embedded within other, non-communication based devices such as vehicles and appliances.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, successfully or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a NG/NR standards among others. In an example, the network interface device 220 may include one or more physical jacks (e.g., Ethernet, coaxial, or phone jacks) or one or more antennas to connect to the transmission medium 226.

The communication device 200 may be an IoT device (also referred to as a "Machine-Type Communication device" or "MTC device"), a narrowband IoT (NB-IoT) device, or a non-IoT device (e.g., smart phone, vehicular UE), any which may communicate with the core network via the eNB or gNB shown in FIG. 1. The communication device 200 may be an autonomous or semiautonomous device that performs one or more functions, such as sensing or control, among others, in communication with other communication devices and a wider network, such as the Internet. If the communication device 200 is IoT device, in some embodiments, the communication device 200 may be limited in memory, size, or functionality, allowing larger numbers to be deployed for a similar cost to smaller numbers of larger devices. The communication device 200 may, in some embodiments, be a virtual device, such as an application on a smart phone or other computing device.

As above, 5G systems may support multiple IAB networks and nodes. IAB networks have been developed due to the increased bandwidth associated with NR compared to LTE (e.g., use of the mmWave spectrum), along with the use of massive MIMO and multi-beam systems. The operation of links between different IAB nodes of the IAB network in the IAB network may be on the same or different frequencies.

Figure 3:
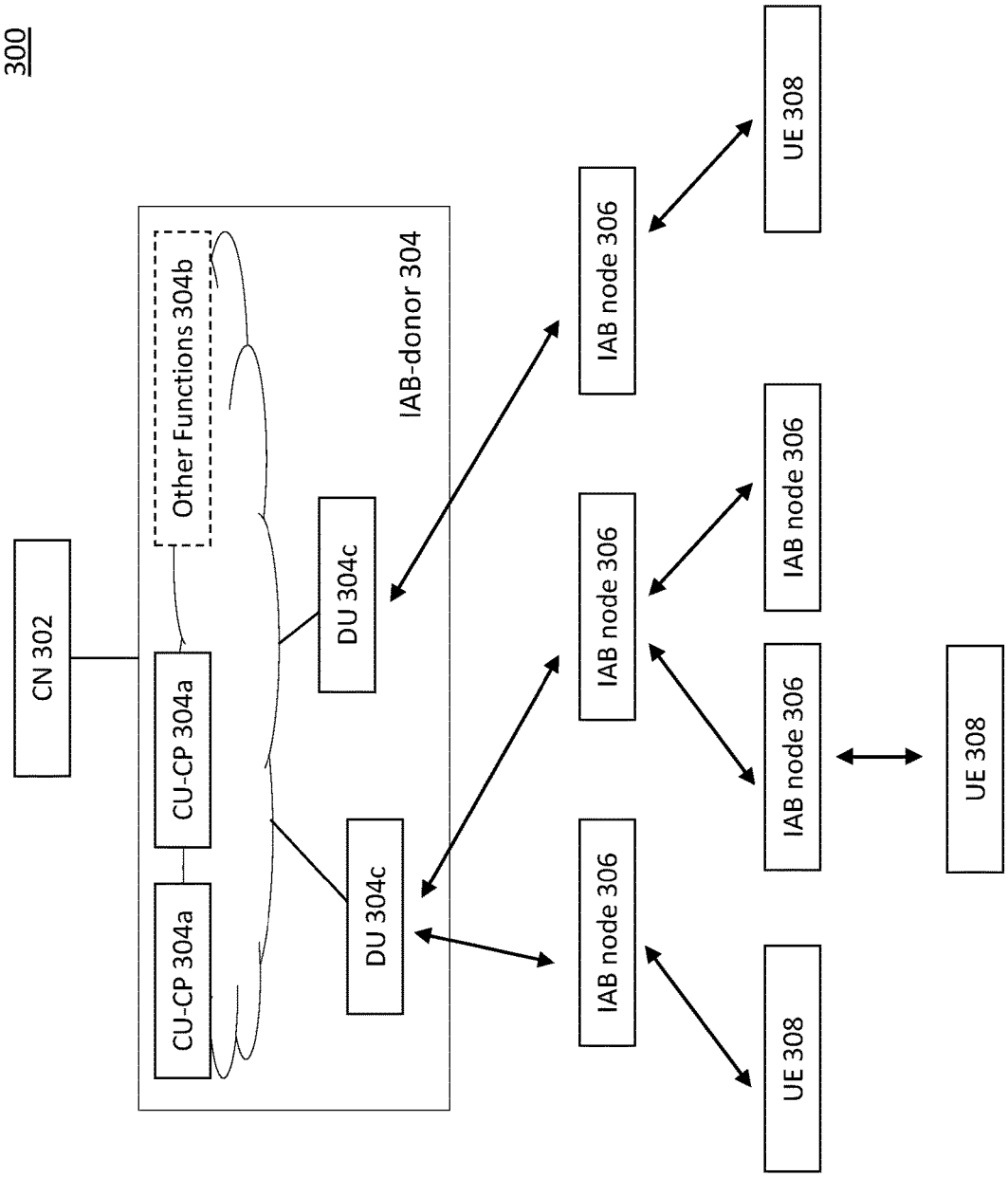
FIG. 3 illustrates an example of an IAB network with UEs in standalone mode in accordance with some embodiments.

FIG. 3 illustrates an example of an IAB network with UEs in standalone mode in accordance with some embodiments. The network 300 includes a core network 302, an IAB-donor 304 and multiple IAB nodes 306. Each IAB node 306 may be a RAN node that supports wireless access to UEs 308 and wirelessly and other IAB nodes as well as backhauling the access traffic. Backhaul may be the part of the network responsible for transporting communication data between the baseband unit (BBU) and the core network (CN) and that connects smaller outlying networks with the CN. Note that as used herein, a downstream IAB node is more hops away from the IAB donor node than an upstream (or parent) IAB node. As shown, the IAB nodes 306, however, may lack full-fledged base station (gNB) capabilities. The IAB network 300 may leverage the Central Unit-Distributed Unit (CU-DU) split architecture found in 5G architecture. The IAB donor node 304 may include both one or more CU-control planes (CPs) 304a and one or more DUs 304c, as well as providing other functions 304b. The RRC functionality may be in the CU-CP 304a of the IAB donor node 304, while each IAB node 306 functions as a DU. The IAB nodes 306 may be controlled by the IAB donor 304 in a manner similar to the DU control by the CU. Specifically, the F1 control plane protocol between the CU and the DU may be modified to support transmission over multiple hops; the modified F1 protocols may enable the IAB donor 304 to control the IAB nodes 306.

Figure 4:
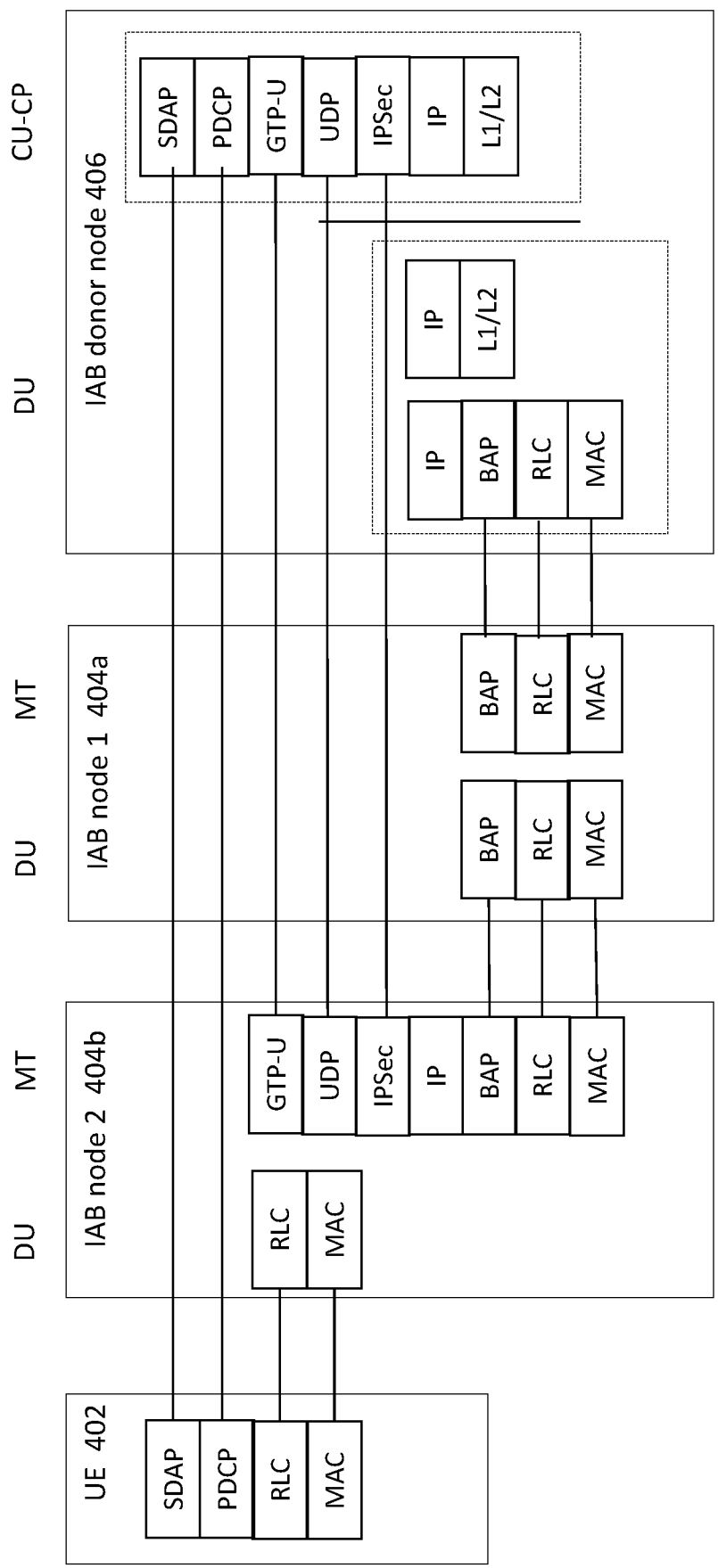
FIG. 4 illustrates an example of user plane protocol architecture for multi-hop IAB network in accordance with some embodiments.

One consequence of the centralized placement of the RRC functionality (i.e., in the CU of the donor IAB node) is that RRC messages from UEs may be routed over multiple hops. If the UE is operating in stand-alone mode, the RRC messages may be transmitted over multiple hops. FIG. 4 illustrates an example of protocol architecture for multi-hop IAB network in accordance with some embodiments. FIG. 4 shows various protocol layers, including Service Data Adaptation Protocol (SDAP), Packet Data Convergence Protocol (PDCP), IP Security (IPSec), and User Plane GPRS Tunneling Protocol (GTP-U). As shown in FIG. 4, each IAB node 404a, 404b operates as a combination of a DU and a mobile terminal (MT). The DU may serve the next hop, and eventually the UE 402. The MT may provide connectivity to the parent node, which may be the IAB donor node 406. The MT of an IAB node 404a, 404b embodies UE functionality to enable connectivity to the parent node. An RRC message traversing multiple hops as shown in FIG. 4 may incur delays at each node related to standard UE operation and air interface delays. The delays can impact critical functions. For example, transmission of a measurement report from the UE 402 to the IAB donor 404b can take significantly longer, resulting in a higher proportion of handover failures and radio link failures. RRC connection establishment, reestablishment and RRC connection resume can take longer, which can result in a significantly lower level of performance compared to a non-IAB network. It is desirable to minimize such additional delays resulting from the multi-hop transmission of RRC messages, and, in other embodiments for other protocols (such as PDCP).

Figure 5:
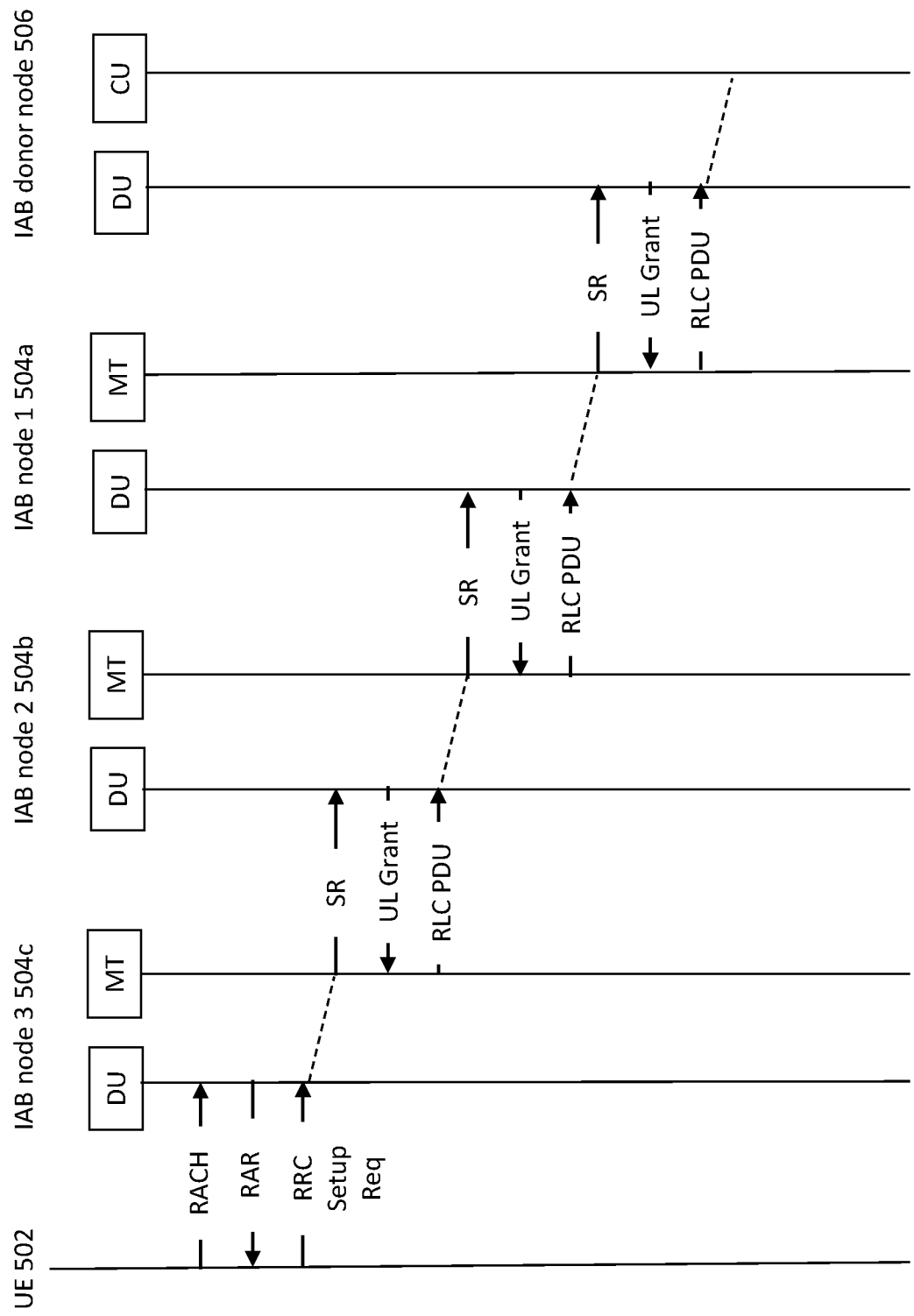
FIG. 5 illustrates an example of multi-hop transmission in accordance with some embodiments.

FIG. 5 illustrates an example multi-hop transmission in accordance with some embodiments. As above, RRC signaling may originate at the UE 502 and traverse multiple IAB nodes 504a, 504b, 504c to arrive at the IAB donor node 506. FIG. 5 shows an example of RRC protocol architecture assuming that the UE 502 is in stand-alone mode. RRC messages from the UE 502 traverse multiple hops as shown. The message transmission can incur delays at each IAB node 504a, 504b, 504c. As above, each IAB node 504a, 504b, 504c may contain a DU and an MT. Note that the UL grant may provide resources based on a buffer status report (BSR) that indicates how much data is stored in the UE for transmission to the IAB donor node. The BSR may be included in an SR or may be a separate transmission. The BSR may be initiated under various conditions, and may be called regular BSRs, Padding BSRs or Periodic BSRs.

Consider the RRC connection establishment case, shown in FIG. 5. The UE 502 may transmit an RRC setup request message to the DU of IAB node 3 504c. The IAB node 3 DU may receive a radio link control (RLC) packet data unit (PDU) containing the RRC setup request and submit the RRC setup request to its MT RLC entity (after appropriate routing decisions) for transmission. The MT of IAB node 3 may treat the incoming RLC PDU as an uplink data arrival event. If no resources are available for uplink transmission, the UE 502 may request uplink resources. The request may be a scheduling request, if configured; otherwise a RACH request may be used. Resources may then be allocated for uplink transmission. Given that typically most services are downstream-heavy, it is likely that at a given instant there is no uplink data in the buffer of the MT. In such a situation, the MT may not have requested uplink resources and is unlikely to have assigned uplink resources for transmission of the RLC PDU.

The MT of IAB node 3 504*c* may transmit the RLC PDU to the DU of IAB node 2 504*b*. IAB node 2 506*c* may repeat the same actions as that of IAB node 3 504*c*, including transmission by the MT of IAB node 2 504*b* of the RLC PDU to the DU of IAB node 1 504*a*. Similarly, IAB node 1 506*a* may repeat the same actions as that of IAB node 3 504*c* and IAB node 2 504*b*, including transmission by the MT of IAB node 1 504*a* of the RLC PDU to the DU of the IAB donor 506. The DU of the IAB donor 506 may then deliver the RLC PDU to the CU of the IAB donor 506. Each hop thus adds an additional delay. The actual values of the additional delay may depend on the configuration at each of the links.

Figure 6:
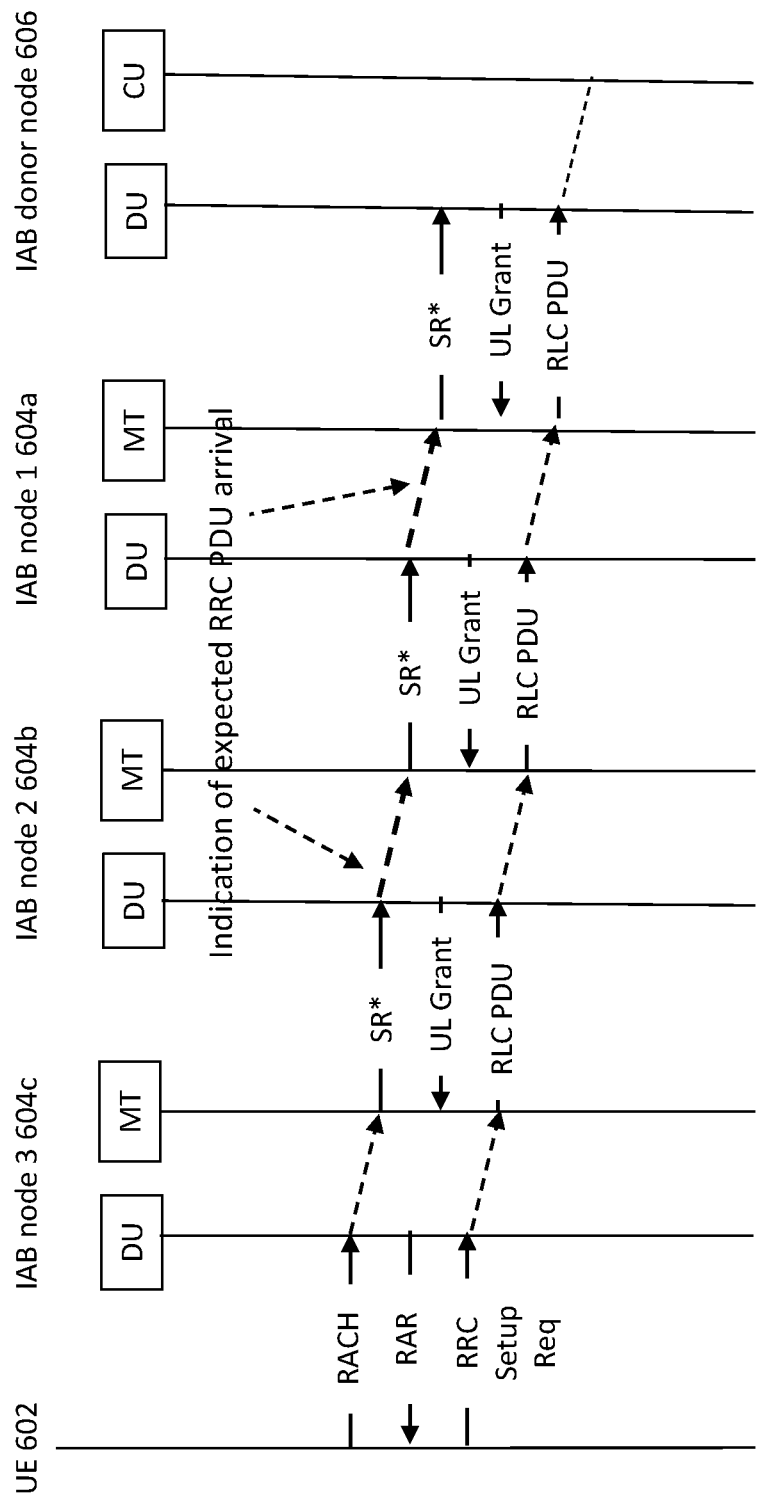
FIG. 6 illustrates an example multi-hop transmission with pre-allocation in accordance with some embodiments.

FIG. 6 illustrates an example multi-hop transmission with pre-allocation in accordance with some embodiments. Similar to FIG. 5 in FIG. 6, RRC signaling may originate at the UE 602 and traverse multiple (intermediate or relay) IAB nodes 604*a*, 604*b*, 604*c* to arrive at the IAB donor node 606. In FIG. 6, however, special scheduling request (SR) resources may be allocated to each IAB node 604*a*, 604*b*, 604*c* by its serving parent node. Successive control plane SRs may be used to allocate resources to predictively allocate resources for uplink transmission on multiple links.

When IAB node 3 604*c* may receive a control plane PDU (e.g., an RRC message transmitted using uplink resources allocated in a Random Access Response (RAR)) from the UE 602. IAB node 3 604*c* may then indicate reception of the control plane PDU to the MT of IAB node 3 604*c*. In response, the MT may trigger a control plane SR transmission (denoted by SR* in FIG. 6) to IAB node 2 604*b* using previously configured control plane SR resources.

In response to the control plane SR, the DU of IAB node 2 604*b* may allocate resources (a UL grant) to the MT of IAB node 3 604*c* for transmission of the control plane PDU. The DU may indicate to the MT of IAB node 2 604*b* of the expected arrival of a control plane PDU. In response, the MT of IAB node 2 604*b* may trigger a control plane SR transmission to IAB node 1 604*a* using previously configured control plane SR resources. The UE 602, in some embodiments (as in other embodiments described herein), may or may not send a buffer status report (BSR). Instead, the IAB nodes 604*a*, 604*b*, 604*c* may, for example, estimate the UL grant resources based on historical amounts of uplink data from the UE 502.

IAB node 3 604*c* may meanwhile use the uplink resources signalled in the uplink grant to transmit the RLC PDU to the DU of IAB node 2 604*b*. When the RLC PDU is received by IAB node 2 604*b* and submitted to the MT for transmission, the MT already has uplink resources to transmit the RLC PDU. Thus, the RLC PDU can be transmitted without delay.

Similarly, IAB node 1 604*a* may receive the control plane SR, allocate resources for transmission from IAB node 2 604*b* and also trigger a control plane SR to the DU of the IAB donor 606. The IAB donor DU may in response allocate resources for transmission from IAB node 1 604*a*. IAB node 2 604*b* may meanwhile transmit the RLC PDU to IAB node 1 604*a*. IAB node 1's MT, may however, already have uplink resources to transmit the RLC PDU. Thus, the RLC PDU may be transmitted without delay.

Triggering of Control Plane SR

When the DU of the serving IAB node of the UE receives the RRC message, the serving IAB node may determine that the transmission is an RRC message. Given that IAB nodes typically do not process RRC messages, the DU may use the logical channel ID (LCD) field in the medium access control (MAC) subheader to determine whether the received RLC PDU contains an RRC message. RRC messages may be mapped to the common control channel (CCCH) or the dedicated control channel (DCCH) logical channel. Specifically, if an RLC PDU is received in uplink resources allocated via a RAR, the DU of the IAB node 3 may determine if the LCD field in the MAC subheader indicates the CCCH or the DCCH logical channel. If the CCCH or DCCH logical channel is indicated, the DU may indicate to the MT that an RRC message is expected. The MT may transmit a control plane SR in response.

The intermediate IAB nodes may also indicate in their respective MAC subheaders that the PDU is for the CCCH or the DCCH. Depending on the protocol architecture chosen, RRC messages from the UE may be carried directly over RLC in the intermediate links or over the F1 interface.

Control Plane SR Details

The control plane SR may be differentiated from the regular SR. This can be done by using separate periodic resources configured for control plane SR transmission by the CU. Alternatively, the control plane SR may use the same resources as the regular SR, but a different cover code may instead be assigned for the PUCCH containing control plane SR transmissions. That is, the network may then configure, at IAB nodes along the route, an SR with orthogonal cover codes. An orthogonal cover code may be reserved for control plane SRs. If an MT of an IAB node receives an RRC message as described above, the MT may transmit an SR with the reserved orthogonal cover code.

Timing of RLC PDU Arrival and Uplink Grant Validity at an IAB Node

RLC PDU arrival at an IAB node 704*a*, 704*b*, 704*c* may not match the availability of the uplink resource at the MT of the IAB node 704*a*, 704*b*, 704*c*. For example, the transmission of the RLC PDU from IAB node 3 704*c* to IAB node 2 704*b* may use more than one HARQ transmission. As a result, the DU of IAB node 2 704*b* may receive the RLC PDU after the time when the UL grant received by MT of IAB node 2 704*b* is applicable.

To still be able to transmit the RLC PDU on the next hop, the parent IAB node (IAB node 1 in this example) may assign semi-persistent uplink resources in the uplink grant. For example, the uplink resources indicated in the UL grant can be valid at periodic intervals for a maximum number of occasions. If the MT uses the UL grant in one of the occasions to transmit the RLC PDU, the assigned resources can be implicitly released. In some embodiments, the semi-persistent resource is established in response to transmission of the indication to the parent IAB node.

Configured Grants for Uplink transmission: the network can use configured grants to allocate resources for control plane message transfer across the backhaul links. The network can configure at the DU of each IAB node semi-persistent resources for uplink transmissions. The MTs of the child IAB nodes can be informed of the semi-persistent resources via their respective RRC links to the IAB donor. The semi-persistent resources may be activated in response to receiving the control plane SR from the MT. The MT may transmit a control plane SR as described above. In response to the control plane SR, the DU may transmit a PDCCH to the MT indicating the activation (and availability) of the semi-persistent resources. The MT may then use the semi-persistent resources to transmit the RRC message.

Discontinuous transmission (DTX) of uplink transmission: to resolve the timing uncertainty described above, the MT can DTX its uplink transmission if the RLC PDU is not available when the UL grant is applicable. To accomplish this, the MT of the IAB node may transmit a control plane SR as described above. The DU of the parent IAB node may receive the control plane SR and signal an UL grant to the MT. Given that the RLC PDU is not available at the time the UL grant is applicable, the MT may not transmit any signals in the resource corresponding to the UL grant. In response to having received the control plane SR, and observing that no transmission was received in the resource indicated in the UL grant, the DU may signal a second UL grant to the MT. In the meantime, the MT may receive the RLC PDU. The DU may then transmit the RLC PDU in the resource indicated in the second UL grant.

SR indicating time slot for UL grant: the SR from the MT can indicate a time slot for which the UL resource should be provided. This enables the IAB node to take into account radio conditions between itself and the downstream node when requesting an UL resource. That is, the MT can conservatively request, via the SR, an UL resource for a timeslot later than the normal time slot. For example, if the link between the UE and IAB node 3 is such that HARQ retransmissions of the RRC message are likely to be needed, the MT can request an UL grant in a later time slot than the normal time slot. The information about the time duration from the SR to the UL resource can be carried in a modified PUCCH signal.

Further delay reduction by optimizing random access channel (RACH) handling

Figure 7:
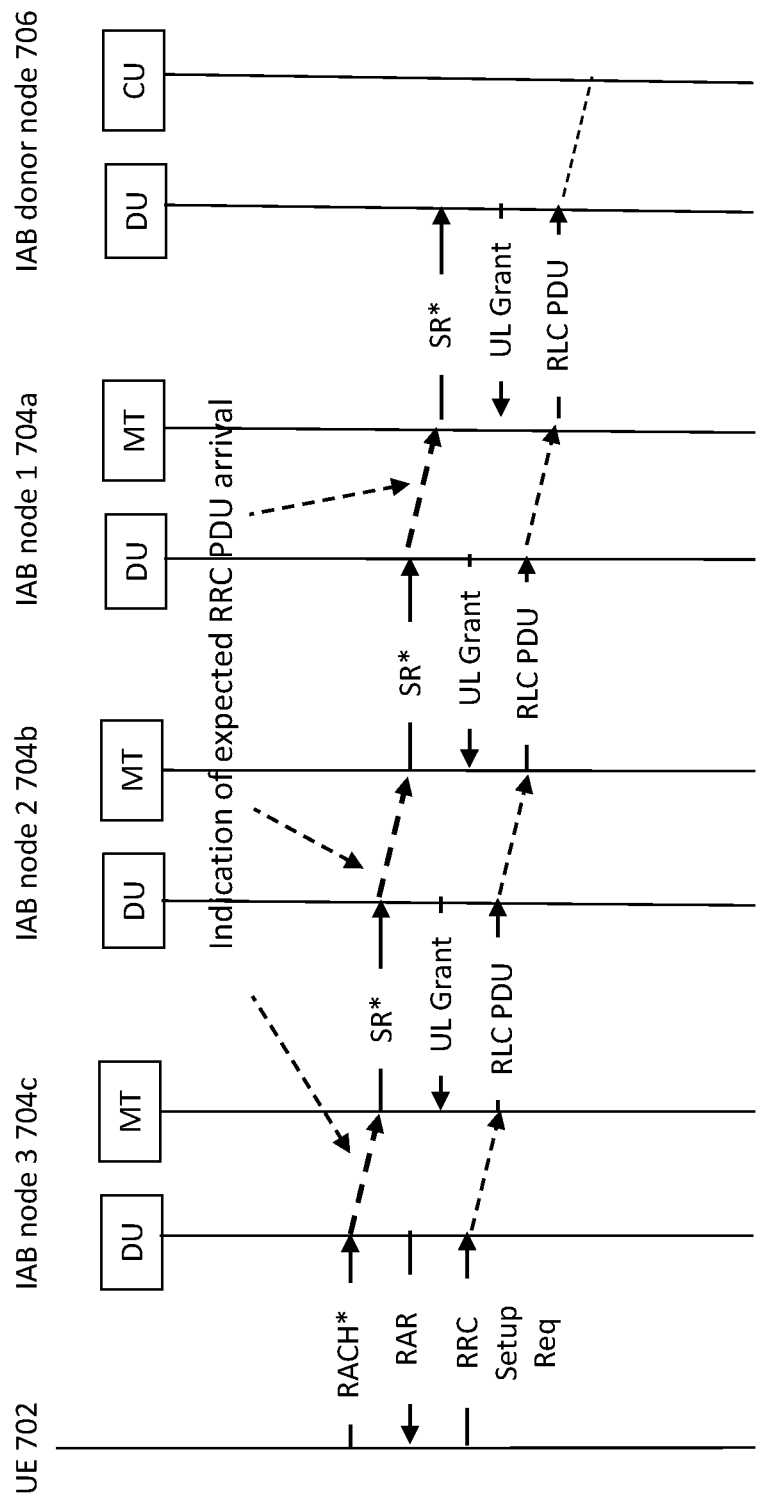
FIG. 7 illustrates an example of random access channel (RACH) handling for multi-hop IAB network transmission in accordance with some embodiments.

FIG. 7 illustrates an example of RACH handling for multi-hop IAB network transmission in accordance with some embodiments. Similar to FIGS. 5 and 6, in FIG. 7 RRC signaling may originate at the UE 702 and traverse multiple IAB nodes 704*a*, 704*b*, 704*c* to arrive at the IAB donor node 706. Further reduction in delay can be achieved by initiating the control plane SR at the serving IAB node's MT in response to a RACH transmission from the UE 702. For procedures where the network expects the UE 702 to perform a RACH, the network can assign a RACH preamble. For UE-initiated RRC procedures (e.g., connection establishment, connection reestablishment), the UE 702 may use a contention-based RACH procedure. That is, the UE 702 may randomly choose a RACH preamble.

If a contention-based RACH is received, that is a RACH where the preamble was not explicitly assigned by the serving IAB node 702*c* or the network, the serving IAB node 702*c* may assume that an RRC message is expected. The serving IAB node 702*c* may in response initiate the control plane SR (SR*) transmission as illustrated in FIG. 7.

Alternatively, the network can configure one or more RACH preambles for RRC procedures. This, however, is not backwards compatible to 3GPP Release 15. The configured preambles may be indicated to the IAB nodes 704*a*, 704*b*, 704*c*. If the serving IAB node 704*c* receives a RACH preamble that is reserved for RRC procedures, the serving IAB node 704*c* may initiate the control plane SR transmission.

High Priority Uplink Data Arrival: if the UE 702 has high priority (urgent) data to transmit, the observations about the multi-hop scheduling delays hold. Techniques described above can be used to mitigate the delay in such a case. The intermediate nodes can be configured with a high-priority SR. When the DU of the serving IAB node 704*c* receives a PDU with an LCD that corresponds to a high priority logical channel, the DU may transmit the high-priority SR. The resource allocation and transmission of the PDU proceed as discussed for the RRC message above.

Delay Reduction Using Contention Based Transmission

Figure 8:
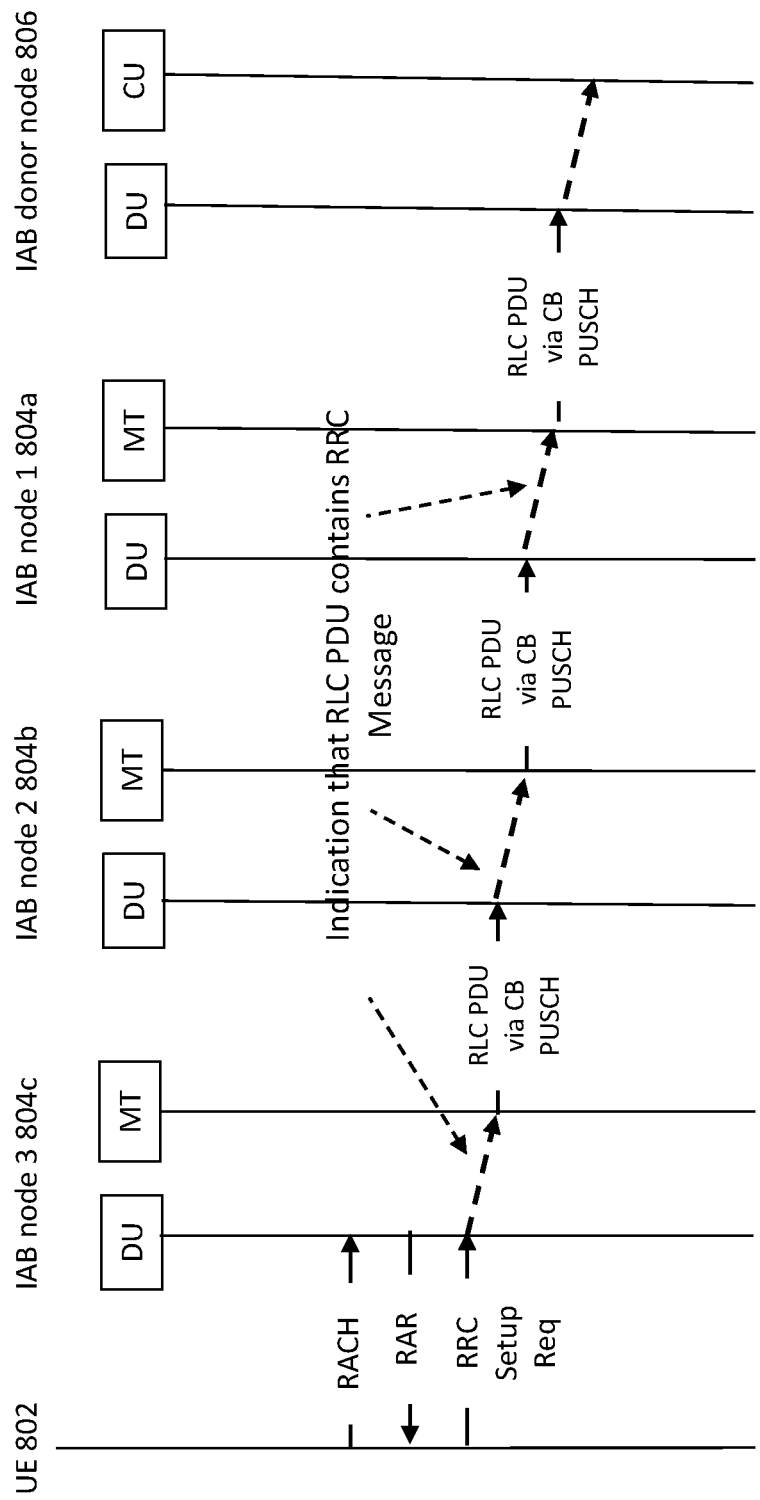
FIG. 8 illustrates an example of multi-hop transmission using a contention-based physical uplink shared channel (CB-PUSCH) in accordance with some embodiments.

FIG. 8 illustrates an example of multi-hop transmission using a contention-based physical uplink shared channel (CB PUSCH) in accordance with some embodiments. Similar to FIGS. 5-7, in FIG. 8 RRC signaling may originate at the UE 802 and traverse multiple IAB nodes 804*a*, 804*b*, 804*c* to arrive at the IAB donor node 806.

Time-frequency resources for CB PUSCH transmission can be configured at the IAB nodes 804*a*, 804*b*, 804*c* for uplink transmission of PDUs containing RRC messages. CB PUSCH resource allocation may include periodically available resources for transmission without explicit resource allocation. The resources may be subject to contention (i.e., two or more UEs could transmit their PDUs in the same time-frequency resource). The probability of contention can be minimized by allocating adequately sized resource pools.

The DU of the serving IAB node 804*c* may determine that the received RLC PDU contains an RRC message using the LCID field as described above. The DU may then submit the PDU to the MT for transmission via the relevant RLC entity, based on routing decisions. The DU may also indicate to the MT that the PDU contains an RRC message. The MT of IAB node 3 804*c* may transmit the PDU using the next available CB PUSCH resource.

IAB nodes 1 and 2 804*a*, 804*b* may similarly determine that the received PDU contains an RRC message and transfer the PDU to their respective MTs with an indication that the received PDU contains an RRC message. The MTs may transmit the PDUs using the next available CB PUSCH resource. The IAB nodes 804*a*, 804*b*, 804*c* may be in connected mode and maintain uplink time alignment. Consequently, additional uplink time alignment steps may be avoided prior to the CB-PUSCH transmission.

To minimize delays before transmission, a large number of time-frequency resources may be set aside for the CB-PUSCH transmission. Given that the resources are used infrequently, this may represent a lot of unused/wasted resources that could have been allocated to transmissions from other IAB nodes or UEs. To combat this issue, while time-frequency resources for CB-PUSCH are configured as above, the CB-PUSCH resources may not always be available for CB-PUSCH transmission. When the serving IAB node 804*c* receives a RACH that suggests that the UE 802 will transmit an RRC message in response to the RAR (e.g., based on the received RACH preamble being UE-selected, or based on the received RACH preamble being in a set reserved for RRC procedures), the DU of the serving IAB node 804*c* may indicate the expected arrival of an RRC PDU to the MT. The MT may then transmit an "Activate CB PUSCH" command to the DU of the parent IAB node 804*b*.

Once the Activate CB PUSCH command is transmitted (or a fixed time offset after transmission), the MT can assume that the CB-PUSCH resources are available for transmission and transmit received RLC PDUs containing the RRC message using CB-PUSCH resources. The next IAB nodes 804*b*, 804*a*, upon receiving the Activate CB PUSCH command may, respectively transmit an Activate CB PUSCH command upstream until the IAB donor 806 is reached. This ensures that CB-PUSCH resources are activated on each hop and the PDU containing the RRC message can be transmitted without delay. Also, the CB-PUSCH resources may be activated only when desired (i.e., explicitly activated) and otherwise permit the resources to be available for use for other UEs and IAB nodes.

The CB-PUSCH resources can be implicitly deactivated upon successful transmission of the RLC PDU. Alternatively, the CB-PUSCH resources can be implicitly deactivated a fixed duration after activation.

Details of Activate CB-PUSCH Command

Figure 9:
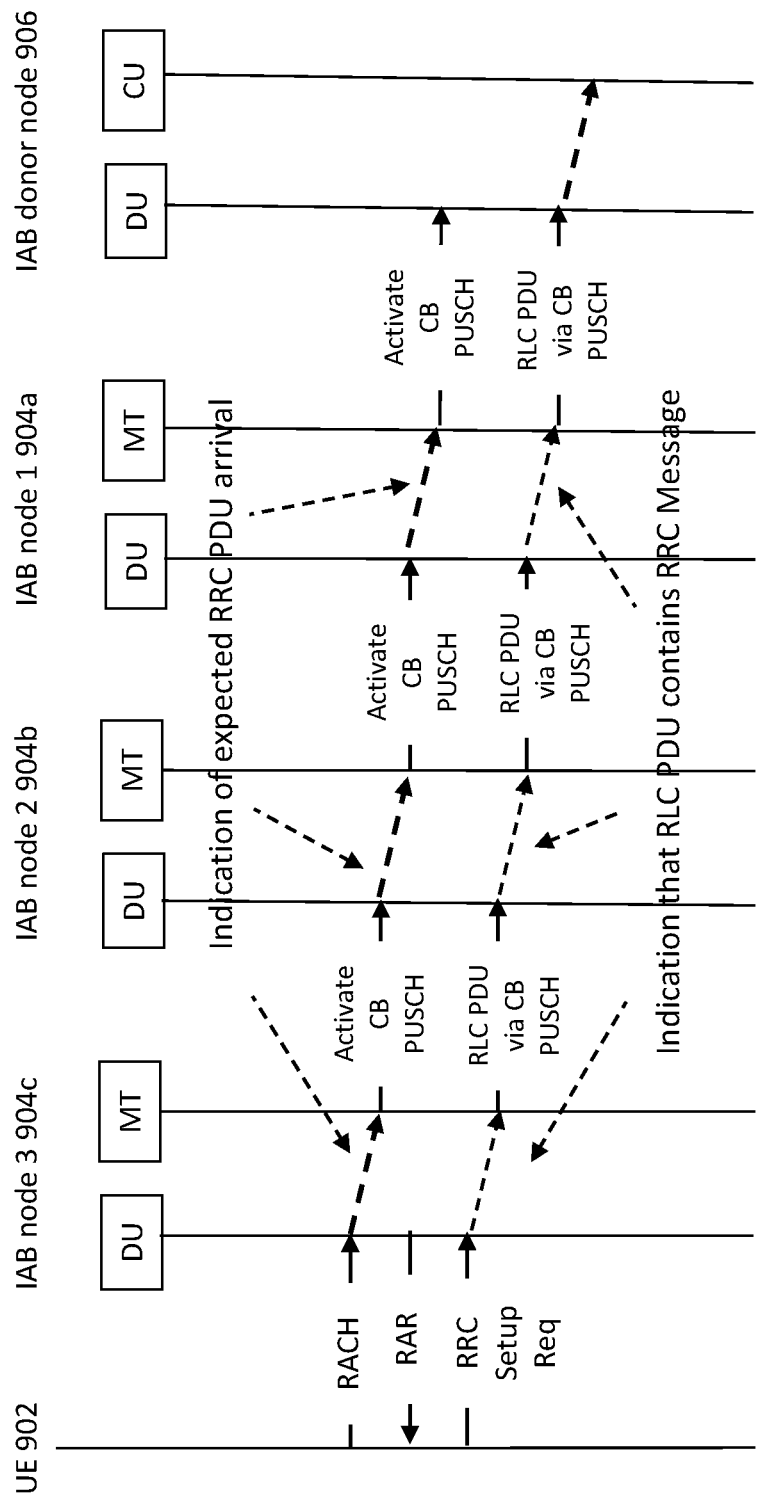
FIG. 9 illustrates an example multi-hop transmission using a CB-PUSCH and activation in accordance with some embodiments.

FIG. 9 illustrates an example multi-hop transmission using a CB-PUSCH and activation in accordance with some embodiments. Similar to FIGS. 5-8, in FIG. 9 RRC signaling may originate at the UE 902 and traverse multiple IAB nodes 904a, 904b, 904c to arrive at the IAB donor node 906. In FIG. 9, an activate CB-PUSCH command may be used to indicate the expected arrival of an RRC PDU, similar to FIG. 5.

The activate CB-PUSCH command is a physical layer indication from the MT to the DU of the parent node. The activate CB-PUSCH command may be a UE-to-network indication. The activate CB-PUSCH command can be defined via one of the existing signals in the NR physical layer specification. For example, as shown in FIG. 9, one SR configuration can be used as an activate CB-PUSCH command in response to receiving either an RRC message (e.g., RRC Setup Request) or a RACH signal indicating the start of an RRC procedure. Alternatively, a dedicated RACH preamble may be used such that the transmission of the dedicated RACH preamble by an MT is interpreted as a request to activate CB PUSCH by the DU of the parent IAB node. Alternatively, or in addition, the activate CB-PUSCH command can be a separate physical layer indication.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72 (b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. An apparatus of a first Integrated Access Backhaul (TAB) node in a 5th generation (5G) backhaul network, the apparatus comprising:
    processing circuitry configured to:
        determine that a first indication has been received from a downstream TAB node, the downstream IAB node having fewer hops to a user equipment (UE) than the first TAB node, the first indication indicating that uplink data is to be transmitted; and
        in response to receiving the first indication, encode a second indication for transmission to a parent IAB node, the parent TAB node having more hops to the UE than the first IAB node,
        wherein the second indication provides predictive information about data expected to arrive at the first IAB Node.

2. The apparatus of claim 1, wherein the processing circuitry is further configured to:
    decode, from the parent TAB node in response to transmission of the second indication to the parent IAB node, a grant of a parent resource for transmission of the uplink data from the first IAB node to the parent TAB node when the parent resource is a physical uplink shared channel (PUSCH) resource;
    decode the uplink data from the downstream TAB node after transmission of the second indication to the parent IAB node; and
    in response to reception of the uplink data, encode the uplink data for transmission to the parent IAB node.

3. The apparatus of claim 2,
    wherein the parent resource is a non-contention based PUSCH resource.

4. The apparatus of claim 1, wherein the processing circuitry is further configured to:
    in response to reception of the first indication from the downstream IAB node, allocate a resource for transmission of the uplink data from the downstream IAB node to the first IAB node; and
    encode, for transmission to the downstream IAB node, a grant of the resource prior to transmission of the uplink data to the parent IAB node.

5. The apparatus of claim 1,
    wherein at least one of the first or second indications is included in a resource request message, and
    wherein a logical channel identifier (LCID) field in a medium access control (MAC) subheader of the uplink data indicates a common control channel (CCCH) or dedicated control channel (DCCH) logical channel.

6. The apparatus of claim 5, wherein the resource request message is a physical layer scheduling request or a buffer status report.

7. The apparatus of claim 1, wherein:
    at least one of the first or second indications is included in a resource request message, and
    wherein the processing circuitry is further configured to communicate the indication using resources reserved for the at least one of the first or second indications.

8. The apparatus of claim 1,
    wherein at least one of the first or second indications is included in a scheduling request (SR), and
    wherein the processing circuitry is further configured to communicate the SR using an orthogonal cover code reserved for control plane SRs.

9. The apparatus of claim 1, wherein:
at least one of the first or second indications is included in a scheduling request (SR) and the SR is initiated based on a radio resource control (RRC) Setup Request.

10. A first Integrated Access Backhaul (IAB) node in a 5th generation (5G) backhaul network, the first IAB node comprising:
a non-transitory computer-readable memory medium; and
processing circuitry configured to:
determine that a first indication has been received from a downstream TAB node, the downstream IAB node having fewer hops to a user equipment (UE) than the first TAB node, the first indication indicating that uplink data is to be transmitted; and
in response to receiving the first indication, encode a second indication for transmission to a parent IAB node, the parent TAB node having more hops to the UE than the first IAB node,
wherein the second indication provides predictive information about data expected to arrive at the first IAB Node, and
wherein the non-transitory computer-readable memory medium is configured to store the first indication.

11. The first TAB node of claim 10, wherein the processing circuitry is further configured to:
decode, from the parent TAB node in response to transmission of the second indication to the parent IAB node, a grant of a parent resource for transmission of the uplink data from the first IAB node to the parent TAB node when the parent resource is a physical uplink shared channel (PUSCH) resource;
decode the uplink data from the downstream TAB node after transmission of the second indication to the parent IAB node; and
in response to reception of the uplink data, encode the uplink data for transmission to the parent IAB node.

12. The first IAB node of claim 11,
wherein the parent resource is a non-contention based PUSCH resource.

13. The first IAB node of claim 10, wherein the processing circuitry is further configured to:
in response to reception of the first indication from the downstream IAB node, allocate a resource for transmission of the uplink data from the downstream IAB node to the first IAB node; and
encode, for transmission to the downstream IAB node, a grant of the resource prior to transmission of the uplink data to the parent IAB node.

14. The first IAB node of claim 10,
wherein at least one of the first or second indications is included in a resource request message, and
wherein a logical channel identifier (LCID) field in a medium access control (MAC) subheader of the uplink data indicates a common control channel (CCCH) or dedicated control channel (DCCH) logical channel.

15. The first IAB node of claim 14, wherein the resource request message is a physical layer scheduling request or a buffer status report.

16. The first IAB node of claim 10, wherein:
at least one of the first or second indications is included in a resource request message, and
wherein the processing circuitry is further configured to communicate the indication using resources reserved for the at least one of the first or second indications.

17. A method for operating a first Integrated Access Backhaul (IAB) node in a 5th generation (5G) backhaul network, the method comprising:
determining that a first indication has been received from a downstream IAB node, the downstream IAB node having fewer hops to a user equipment (UE) than the first IAB node, the first indication indicating that uplink data is to be transmitted;
in response to receiving the first indication, encoding a second indication for transmission to a parent IAB node, the parent IAB node having more hops to the UE than the first IAB node, wherein the second indication provides predictive information about data expected to arrive at the first IAB Node; and
storing the first indication in a non-transitory computer-readable memory medium.

18. The method of claim 17, the method further comprising:
decoding, from the parent IAB node in response to transmission of the second indication to the parent IAB node, a grant of a parent resource for transmission of the uplink data from the first IAB node to the parent IAB node when the parent resource is a physical uplink shared channel (PUSCH) resource;
decoding the uplink data from the downstream IAB node after transmission of the second indication to the parent IAB node; and
in response to reception of the uplink data, encoding the uplink data for transmission to the parent IAB node.

19. The method of claim 18,
wherein the parent resource is a non-contention based PUSCH resource.

20. The method of claim 17, the method further comprising:
in response to reception of the first indication from the downstream IAB node, allocating a resource for transmission of the uplink data from the downstream IAB node to the first IAB node; and
encoding, for transmission to the downstream IAB node, a grant of the resource prior to transmission of the uplink data to the parent IAB node.

* * * * *

UNITED STATES PATENT AND TRADEMARK OFFICE
CERTIFICATE OF CORRECTION

PATENT NO. : 11,463,938 B2  
APPLICATION NO. : 17/275108  
DATED : October 4, 2022  
INVENTOR(S) : Zhang et al.

Page 1 of 1

It is certified that error appears in the above-identified patent and that said Letters Patent is hereby corrected as shown below:

In the Claims

Column 12, Line 3, delete "TAB" and insert --IAB--.

Column 12, Line 7, delete "TAB" and insert --IAB--.

Column 12, Line 9, delete "TAB" and insert --IAB--.

Column 12, Line 13, delete "TAB" and insert --IAB--.

Column 12, Line 21, delete "TAB" and insert --IAB--.

Column 12, Line 25, delete "TAB" and insert --IAB--.

Column 12, Line 27, delete "TAB" and insert --IAB--.

Column 13, Line 12, delete "TAB" and insert --IAB--.

Column 13, Line 14, delete "TAB" and insert --IAB--.

Column 13, Line 18, delete "TAB" and insert --IAB--.

Column 13, Line 25, delete "TAB" and insert --IAB--.

Column 13, Line 27, delete "TAB" and insert --IAB--.

Column 13, Line 31, delete "TAB" and insert --IAB--.

Column 13, Line 33, delete "TAB" and insert --IAB--.

Signed and Sealed this  
Twenty-third Day of May, 2023

Katherine Kelly Vidal  
*Director of the United States Patent and Trademark Office*